Dec. 25, 1951  A. E. LITTLE  2,580,309
CAMERA TRACK STRUCTURE
Filed Feb. 2, 1949  2 SHEETS—SHEET 1
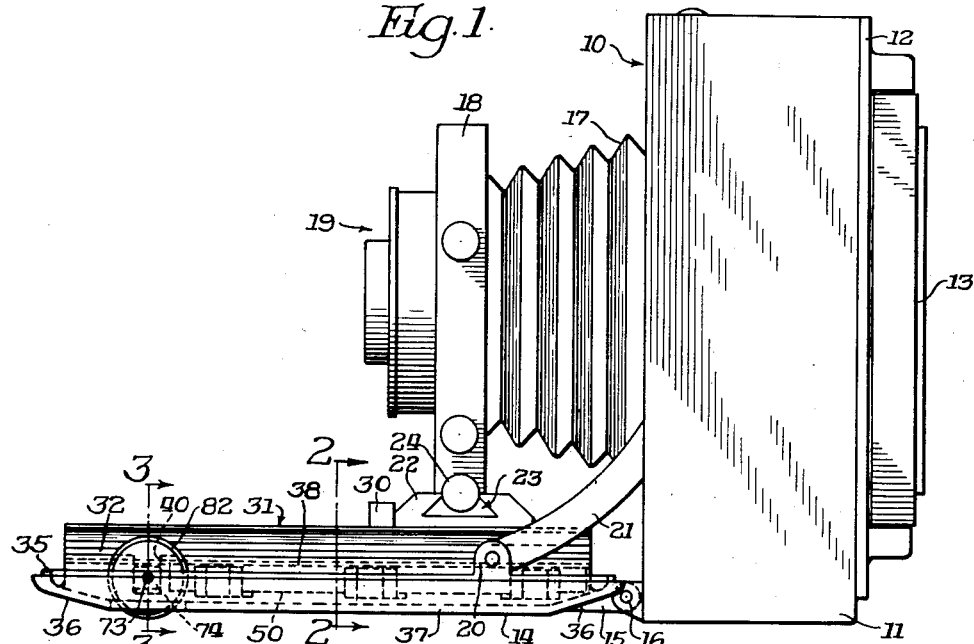
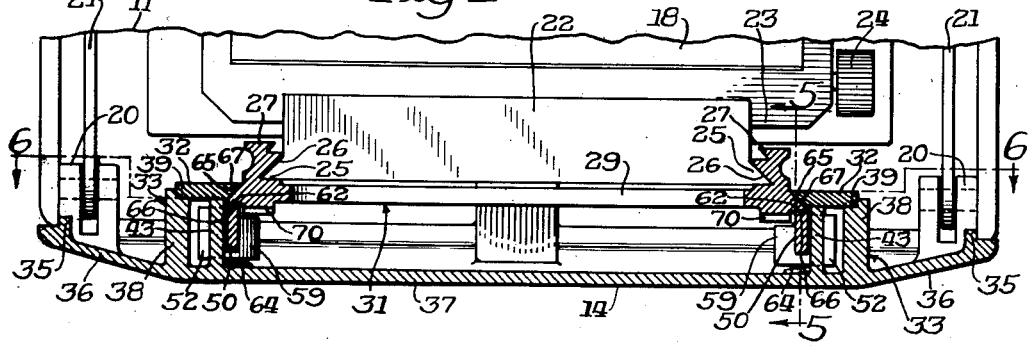
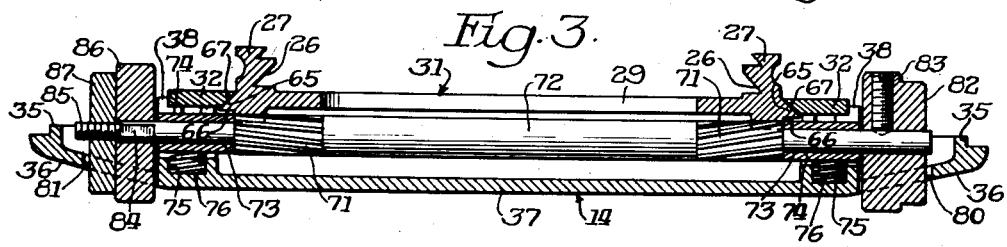
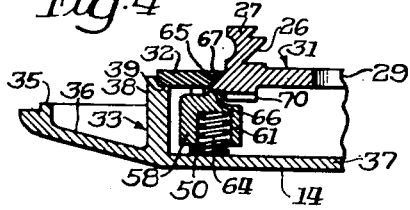
INVENTOR.
Alfred E. Little
BY
George S. Jims
Attys.

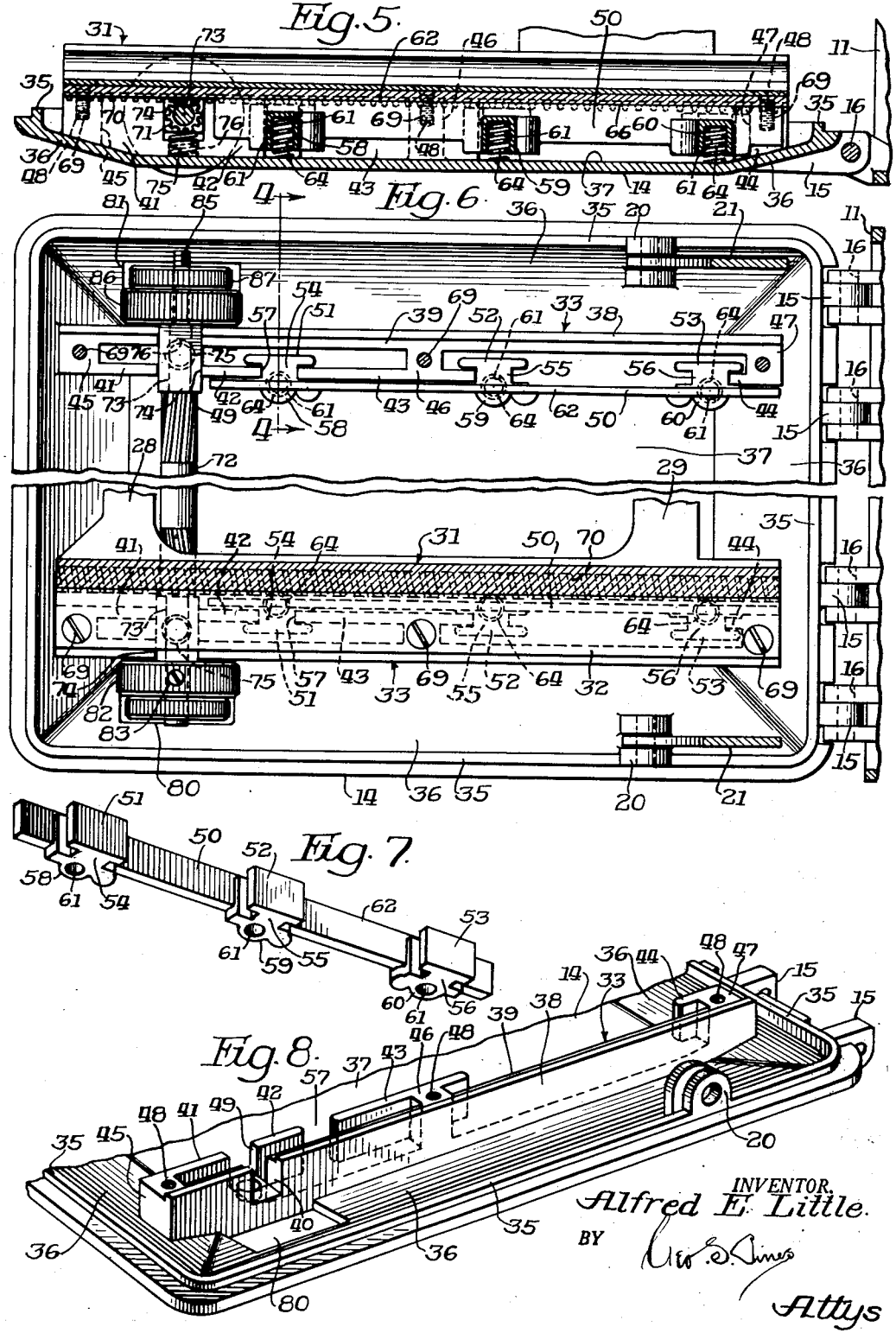

Patented Dec. 25, 1951

2,580,309

UNITED STATES PATENT OFFICE 2,580,309

CAMERA TRACK STRUCTURE

Alfred E. Little, Chicago, Ill., assignor to Busch Precision Camera Corporation, Chicago, Ill., a corporation of Illinois Application February 2, 1949, Serial No. 74,119

1 Claim. (Cl. 95—46)

This invention relates generally to a structure for camera tracks which are adapted to slide relative to a camera bed for adjusting the focus of a camera.

The type of camera with which this invention is concerned includes a lens carried by a standard which is movable relative to a track. After the lens is fixed to the track, such as for example in opening the camera from a folded condition, the track is adapted to be adjusted relative to the bed of the camera by means of a gear and rack mechanism. The position of the camera lens standard relative to the track is capable of being fixed for a given set of conditions whereby an indicator carried by the track may properly read focal distance in cooperation with indicia fixed relative to the camera bed. Wear of the operating parts of the mechanism and backlash between the gear and rack portion thereof will result in a misadjustment of the index. In the event that the track is loosely mounted upon the bed, the lens standard may not be perfectly parallel with the photographic film, or may result in bad photography due to shaking of the lens standard, etc.

The primary object of the invention is to correct all of the above faults and render the track firmly pressed to the track guides during the entire life of the camera.

Still a further object of the invention is to provide for means for automatically taking up the wear between the moving parts of the camera track and its mounting.

Still a further object of the invention is to provide a camera track structure in which the track is resiliently mounted.

Still a further object of the invention is to provide a camera track having a pinion and rack mechanism in which the shaft carrying the pinions is mounted upon springs in order to take up backlash and wear and to provide a firm connection with the rack at all times.

With the foregoing and other objects in view which will appear as the description proceeds, the invention consists of certain novel features of construction, arrangement and a combination of parts hereinafter fully described, illustrated in the accompanying drawings, and particularly pointed out in the appended claim, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a side elevational view of a bellows type camera having my invention associated therewith.

Fig. 2 is a sectional view taken through the camera bad and track on the line 2—2 of Fig. 1 and looking into the direction indicated.

Fig. 3 is a similar view but taken on the line 3—3 of Fig. 1.

Fig. 4 is a fragmentary sectional view taken along the line 4—4 of Fig. 6 in the direction indicated.

Fig. 5 is a sectional view taken along the length of the camera bed at the line 5—5 indicated in Fig. 2.

Fig. 6 is a top plan view of the camera bed and track mechanism with a portion of the track removed to show certain details.

Fig. 7 is a perspective view of the pressure bar member which presses against the bottom of the track.

Fig. 8 is a perspective view showing the camera bed with all of the mechanism removed therefrom.

Referring now to the figures, the reference character 10 designates generally a camera of the graphic type and comprising a camera body 11, a rear wall 12 covered by a plate holding device 13, which may have a viewing screen associated therewith. The front wall 14 of the camera is provided with hinges 15 pivoted at 16 to the bottom of the camera body 11, so that the said wall 14 may open to form the bed of the lens standard in a manner to be described. The camera includes a bellows 17 secured to a lens standard 18 which carries the lens and its housing indicated generally at 19.

The wall 14 which will hereinafter be termed the bed, is provided with integrally formed pivot ears 20 to which there is pivoted the link 21 secured to the camera body 11 in order to fix the position of the bed 14 relative to the body 11 when said bed is arranged perpendicularly thereto. The lens standard 18 is mounted upon a base member 22 by means of a sliding dove-tail connection indicated generally at 23 whereby said standard may be moved transversely of the bed 14 by means of a thum-screw 24. Said base member 22 is in turn provided with flared flanges 25 along the lowermost edges thereof which flanges 25 are adapted to slidingly engage within the rabbets 26 formed in the track rails 27 as best shown in Figures 3 and 4.

The track rails 27 are approximately the same length as the bed 14 and are of uniform cross-section throughout. The rabbet 26 faces inwardly so that the flanges 25 dove-tail thereinto. Said track rails 27 are integrally formed with front and rear interconnecting cross members 28 and 29 as shown in Fig. 6. An aligned track (not shown) is provided within the camera body 11 so that when the camera is in closed condition the base 22 is engaged upon the camera track within the body 11. When the camera is opened the operator grasps a clamping device indicated diagrammatically at 30 in Fig. 1 between his fingers, releases the base 22 from the track within the body 11, slides same forward of the camera and onto the track rails 27, releasing the clamping device 30 when the base 22 has been properly positioned as desired upon the rails 27.

The track member which is indicated generally as 31 and which consists of the said track rails 27 and the cross members 28 and 29 is adapted to be moved along the bed 14, to the right and left as viewed in Fig. 1, carrying the lens standard 13 therewith. The purpose of this is to enable precise focusing while the camera is being used to photograph objects. The track moves relative to retaining strip guide members 32 which are fixed relative to the bed 14. By means of cooperative indicia (not shown) carried by the side rails 27 and said guide members 32 the focal distance for any set of conditions can be determined, providing the lens standard 13 has been properly positioned relative to the track member 31. Moreover, by adjusting the position of the track relative to the camera bed 14 while viewing the image, for example, on a ground glass screen associated with the device 13 it is possible to obtain accurate focus of said image.

Referring now to Figs. 6, 7 and 8 the camera bed 14 is provided about its edges with a lip 35 adapted to seat within the open face of the camera body 11. The portion of the bed 14 within the lip 35 is dished downwardly as viewed in Fig. 8 and as shown especially in the sectional views of Figs. 2, 3 and 4. The dished formation gives rise to downwardly slanting portions 36 and the central horizontal portion 37 which is considerably below the lip 35. Integrally formed with the bed 14 at the juncture of the portions 36 and 37 are formations indicated generally at 33 which extend along the length of the bed 14 parallel with opposite edges thereof and inwardly placed therefrom. Said formations 33 each consists of a vertically arranged strip 38 provided along its upper edge with a shoulder 39 and having a recess 40 provided near the front thereof for a purpose to be described. Spaced from and parallel with the strips 38 are additional strips 41, 42, 43 and 44 all in alignment and having their vertical extent on a level with a shoulder 39. Interconnecting portions 45, 46 and 47 are provided as shown in Fig. 8 for the purpose of strengthening the strips and as well to provide anchoring for certain fastening means presently described. For this latter purpose each of the portions 45, 46 and 47 is drilled and threaded as indicated at 48. It will be noted that between the strips 42 and 41 there is provided a space 49 in alignment with the recess 40 of the strip 38.

The strip members 42, 43 and 44 are intended for the purpose of posititoning the pressure bar 50 relative to the track rails 27. For this purpose the pressure bar, which is shown in its entirety in Fig. 7, is provided with offset parallel guide members 51, 52 and 53 equally spaced from the pressure bar 50 and connected thereto by means of the necks 54, 55 and 56 respectively. The neck 54 is intended to be engaged within the space 57 formed between the ends of the strips 42 and 43, while the necks 55 and 56 are engaged between the ends of the strips 43 and 44 as shown in Fig. 6. Obviously the pressure bar members 50 and the construction of the strips 38, 41, 42, 43 and 44 are identical on opposite sides of the bed 14, albeit both face inwardly. Each of the necks 54, 55 and 56 are thickened to form a spring housing as indicated at 58, 59 and 60 and each housing is bored out to form a cylindrical cavity as shown at 61. It will be noted that the upper edge 62 of the pressure bar 50 is placed above the upper edges of the parallel guide members 51, 52 and 53 so that when the track member 31 is engaged by the pressure bars 50 there will be no interference between the guide members 51, 52 and 53 and any other parts.

In the assembled condition coil springs 64 are disposed within the cavities 61 so that the bottom ends thereof engage the dished portion 37 as viewed in Fig. 5 while the upper ends of said springs are engaged against the bases of the cavities 61. The length of said springs is such that the pressure bar 50 will have its edge 62 disposed at a higher level than the normal level of the track member 21 where same is adapted to engage said pressure bar edge.

Referring now once more to Figs. 2, 3 and 4 note that each of the track rails 27 has a flange 65 along its outer edge and at the bottom thereof. Said flange has a lower horizontal bearing surface 66 and an upper slanting bearing surface 67. The upper surface 67 on each of the flanges 67 slants downwardly and away from the rails 27 of the track member 31. The retainer members 32 are provided with cooperatively slanting edges adapted to engage the bearing surfaces 67, said retainer members 32 are engaged upon the shoulders 39 and upon the upper edges of the strip members 41, 42, 43 and 44. Same are held in this position by means of screws 69 which engage within the above referred to screw threaded openings 48. In assembly the track member 31 is pressed downwardly so that the bearing surfaces 66 engage the bearing edge 62 of the surface bars 50 pushing same downwardly and thereby compressing the springs 64 so that the track member 31 is thereby resiliently mounted upon springs. Although three of the springs 64 are shown at each side with their cooperating housings and cavities it should be obvious that any number of such springs could be used. Obviously as the camera track 31 is slid relative to the retaining member 32, any wear that occurs between the bearing surfaces 67 and the edges of the retaining members 32 will immediately be taken up by the upward pressure of the springs 64. Also, by reason of the slanted connection between said bearing surfaces 67 and the inward edges of the retainer member 32 the sliding connection will always be firm and without play.

The track rails 27 are each formed with a downwardly extending rack 70 having the usual teeth along its entire length. Said racks 70 are adapted to engage the gears 71 which may be either secured to or formed as a part of a transverse shaft 72 having a reduced diameter portion 73 at opposite ends thereof journalled in the bushings 74, said bushings are adapted to be engaged within the recesses 40 and the opening 49, resting upon springs 75 housed in recesses 76 provided in the bed 14 at these points. When the track member 31 is assembled upon the bed, it is obvious that the springs 75 bearing against the bushing 34 will press the gears 71 against the racks 70 and thereby prevent play and taking up wear.

The camera bed 14 is provided with cut out portions 80 and 81 in the forward portions of the dished portions 36 as shown in Figs. 6 and 8. The right hand reduced diameter portion 73 has a thumb screw 82 secured thereto by a set screw 83 as indicated in Fig. 3 while the left hand reduced diameter portion 73 has a flattened portion 84 and has the extreme end thereof screw-threaded as indicated at 85. A thumb screw 86 having a center opening of the same shape as the reduced diameter portion 73 and the flat portion 84 is disposed upon the portion 73 and adapted to slide axially thereof but prevented from rotating relative thereto by reason of the flattened portion 84. A locking nut 87 is screw-threaded upon the end 85 so that by turning the locking nut 87 the shaft 72 may be locked in any position thereby fixing the camera track member 31 relative to the bed 14 as desired.

It will be seen that I have provided a camera track mechanism which is capable of outlasting similar mechanisms heretofore used by reason of the ability of my structure to take up wear and play of the moving parts thereof. It should also be noted that by means of my new construction accurate presetting of focus is obtained and as well more satisfactory photographic results can be obtained.

It is believed that this invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of this invention as defined in the appended claim.

What is claimed and desired to secure by Letters Patent of the United States is:

In a camera track structure, means for slidably supporting a track upon a camera bed comprising a pair of parallel vertically arranged strip members secured to the bed along the length thereof and having strip guide members secured to their respective upper edges, said strip guide members being in bearing engagement with upper surfaces of the track, a plurality of vertically arranged strips spaced from and parallel with said strip members, said strips being secured to said bed, a pair of elongate pressure members parallel to said strip members, a plurality of guide members offset and equally spaced from said pressure members and having necks connecting the same to said members respectively, each of said strips being engageable with an associated guide member whereby to confine said pressure members against motion parallel to the bed, but permitting motion perpendicular thereto, housings integral with said pressure members and having downwardly opening cavities, coil springs loosely confined in the cavities and having their lower ends bearing against the cameral bed whereby resiliently to support said pressure members and space same from the bed, said pressure members engaging the bottom of said track and thereby pressing the upper surfaces of said track into engagement with said strip guide members.

ALFRED E. LITTLE.

REFERENCES CITED

The following references are of record in the file of this patent:

UNITED STATES PATENTS

| Number | Name | Date |
| --- | --- | --- |
| 1,524,289 | Christie | Jan. 27, 1925 |
| 2,293,438 | Liebmann et al. | Aug. 18, 1942 |
| 2,376,416 | Campbell | May 22, 1945 |
| 2,449,156 | Wittig | Sept. 14, 1948 |

FOREIGN PATENTS

| Number | Country | Date |
| --- | --- | --- |
| 13,242 | Great Britain | of 1908 |
| 107,245 | Austria | Sept. 10, 1927 |